United States Patent [19]

Timmermans et al.

[11] Patent Number: 4,646,141

[45] Date of Patent: Feb. 24, 1987

[54] TELEVISION CAMERA

[75] Inventors: Francisccus W. A. Timmermans; Bernardus A. Kuiper, both of Breda, Netherlands

[73] Assignee: U.S. Philips Corporation, New York, N.Y.

[21] Appl. No.: 721,970

[22] Filed: Apr. 11, 1985

[30] Foreign Application Priority Data

Jan. 28, 1985 [NL] Netherlands ........................ 8500219

[51] Int. Cl.[4] ......................... H04N 9/09; H04N 5/30

[52] U.S. Cl. ........................................ 358/50; 358/41; 358/51; 358/52; 358/55; 358/229

[58] Field of Search ....................... 358/41, 50, 51, 52, 358/55, 229, 218, 219; 313/479; 315/8; 174/35 R, 35 TS; 328/7

[56] References Cited

U.S. PATENT DOCUMENTS 4,218,712 8/1980 Clymer et al. ...................... 358/229
4,274,031 6/1981 Saito ....................................... 315/8
4,298,894 11/1981 Takamura .......................... 358/229
4,556,821 12/1985 Cooper .................................. 315/8

*Primary Examiner*—Michael A. Masinick
*Assistant Examiner*—Cynthia D. Smith
*Attorney, Agent, or Firm*—Thomas A. Briody; Jack Oisher; William J. Streeter

[57] ABSTRACT

A color television camera has several pick-up tubes (T1, T2, T3) which are arranged substantially horizontally or vertically in the camera. The pick-up tubes (T) each have a mu-metal shielding (mu1) against magnetism. Each substantially vertically arranged pick-up tube (T2, T3) has an additional second mu-metal shielding (mu2, mu2'), which is absent for the horizontally arranged tube. The second shielding mav be in the form of a single plate (mu2), overlapping the pick-up tube or two plates (mu2, mu2') arranged on both sides of the pick-up tube and overlapping the tube. Deflection errors, especially in the corners of the television pictures caused by magnetic fields, are reduced to acceptable values.

8 Claims, 2 Drawing Figures

TELEVISION CAMERA

Figure 1:
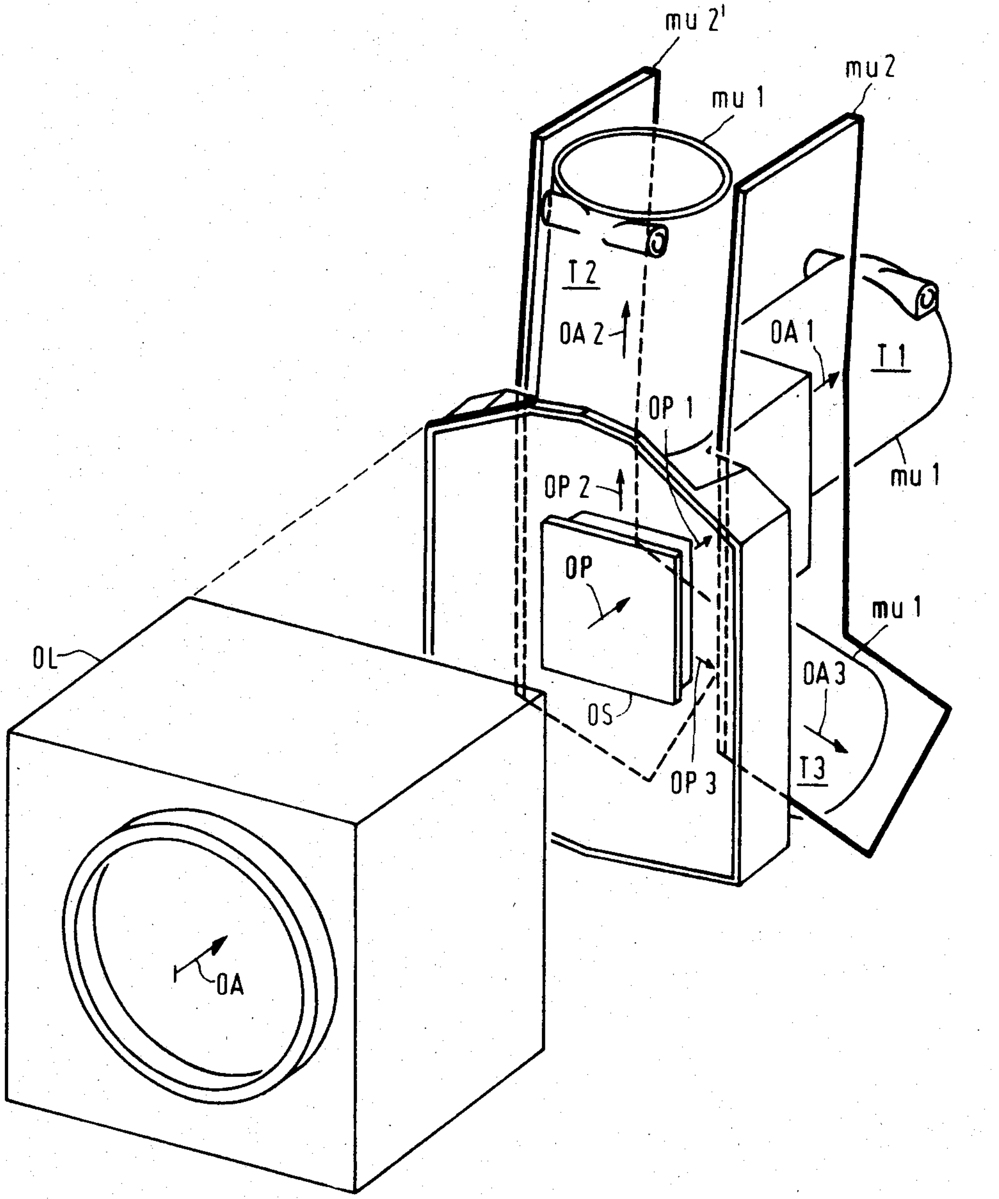

The invention relates to a television camera comprising at least one pick-up tube, a dual mu-metal shielding against magnetism provided at the pick-up tube and having first and second shielding members, and an objective lens, the pick-up tube being arranged in the camera in an optical path subsequent to the lens.

Such a camera is disclosed in U.S. Pat. No. 4,218,712. The first shielding member of the dual mu-metal shielding against magnetism is provided as a cylindrical inner sleeve and the second shielding member as a cylindrical outer sleeve, overlapping the pick-up tube. Deflection and focussing coils for an electron beam generated in the pick-up tube are arranged between the inner sleeve and the pick-up tube. The dual mu-metal shielding has for its object to prevent errors in the generation of picture signals by the pick-up tube, caused by the earth's magnetic field and/or strong electro-magnetic fields. The dual mu-metal shielding attenuates these axial and radial magnetic fields to an adequate extent, so that the pick-up tube present in a stationary of mobile camera generates a picture signal which is free from annoying deflection and focussing errors on display.

When the television camera is a colour television camera having a plurality of pick-up tubes, the magnetic field produces an error in the picture signal generation in each pick-up tube. These errors depend on the position of the relevant pick-up tube in the magnetic field. Apart from these errors, television cameras comprising a plurality of pick-up tubes have so-called raster registration errors; to compensate for such errors an electronic picture signal correction is effected. In practice it has been found that the electronic registration correction can also be effected with sufficient accuracy for a stationary camera, but not for a mobile camera, to compensate with sufficient accuracy for the deflection errors caused by the magnetic field.

A simpler, but costly solution would be to provide each of the several pick-up tubes in the colour television camera with a dual cylindrical mu-metal shielding against magnetism.

The invention has for its object to provide a less costly solution. According to the invention, a television camera is characterized in that the camera, which is in the form of a colour television camera comprising a plurality of pick-up tubes, comprises at least one pick-up tube with a single mu-metal shielding in addition to the at least one pick-up tube having the dual mu-metal shielding, the axial axis of the at least one pick-up tube with the dual mu-metal shielding extending, when the optical axis of the objective lens extends substantially horizontally, substantially in a vertical direction and the axial axis of the at least one pick-up tube with the single mu-metal shielding extending substantially in a horizontal direction.

The invention is based on the recognition that for a satisfactory picture signal generation it may be sufficient to provide only a portion of the plurality of pick-up tubes in the colour television camera with a dual mu-metal shielding. Related to the earth surface with the associated horizontal and vertical directions, it is necessary for a proper operation of the camera that the single or several pick-up tubes having the single mu-metal shielding extend substantially in a horizontal direction and the single or several pick-up tubes having the dual mu-metal shielding extending substantially in a vertical direction. Then, when the camera is tilted, rotated and moved in the magnetic field, reduced image registration errors during picture signal generation and display occurred in practice.

A practically noticable improvement of the image signal registration is obtained in an embodiment of a television camera according to the invention, which is characterized in that the second shielding member of the dual mu-metal shielding is in the form of a plate arranged near the pick-up tube, the predominantly solid plate surface covering the pick-up tube with an overlap at one side.

A still further improvement in the image signal registration is obtained in an embodiment which is characterized in that the second shielding member of the dual mu-metal shielding comprises two plates, arranged on both sides of the pick-up tube.

A television camera comprising two pick-up tubes with a dual mu-metal shielding has been found to result in practice in a still further improvement of the image signal registration, if it is characterized in that when the camera comprises two pick-up tubes with the dual mu-metal shielding the shielding in the form of a plate is constituted by one plate overlapping both pick-up tubes.

The described plate structure of the second shielding member of the mu-metal shielding has the advantage compared to the prior art cylinder that it still further reduces the cost. In practice it has been found that the use of one single plate overlapping the two pick-up tubes reduces the maximum deflection error by approximately 50%, the two overlapping plates on both sides of the pick-up tube reducing the error to approximately one third.

A further error reduction of 10 to 20% is obtained in an embodiment of a television camera according to the invention which is characterized in that the second shielding member in the form of a plate is constituted by an annealed plate.

Figure 2:
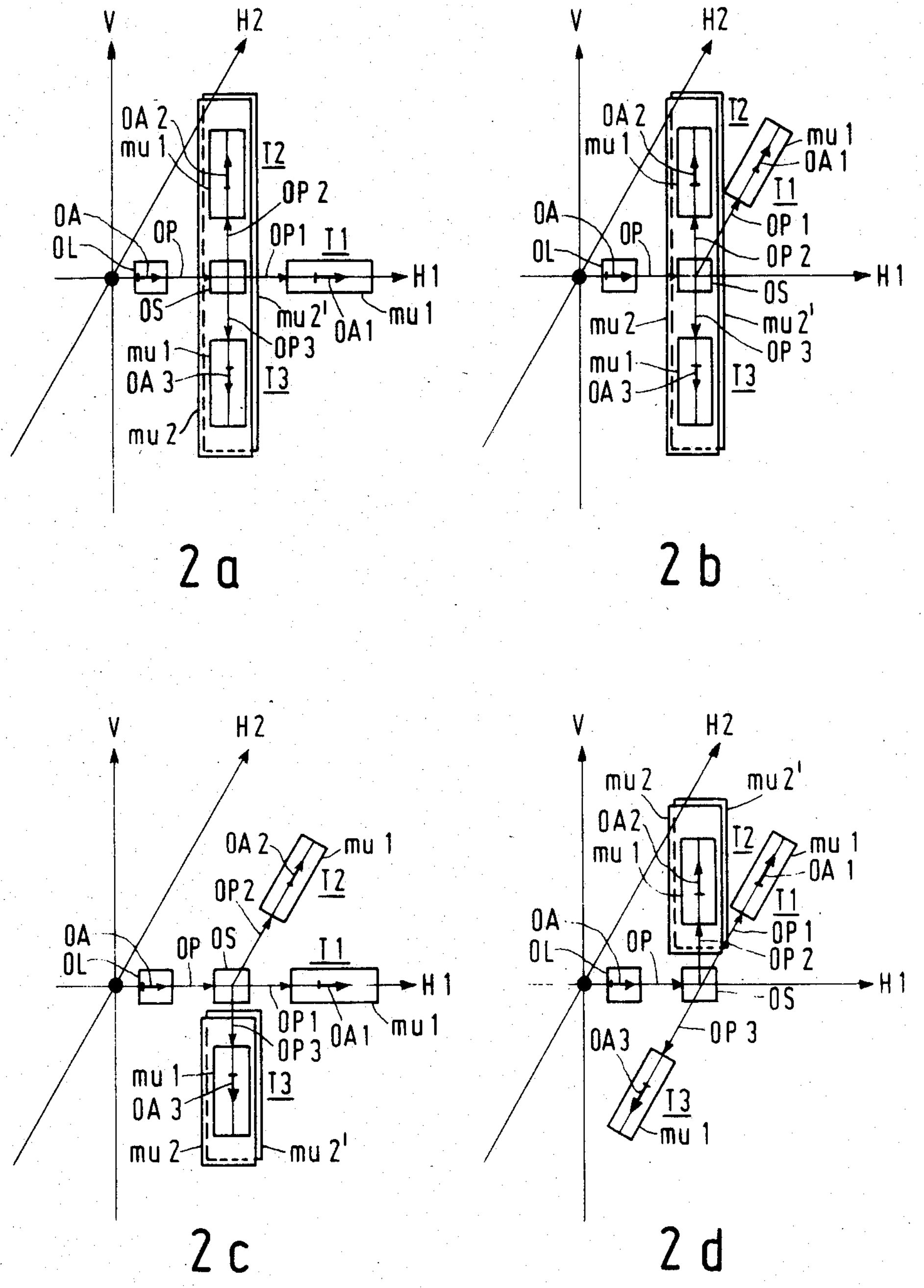

The invention will now be described in greater detail by way of example with reference to the accompanying drawings, wherein FIG. 1 shows schematically an embodiment of a television camera according to the invention, suitable for colour television, and FIG. 2 illustrates schematically by means of FIGS. 2*a*, 2*b*, 2*c* and 2*d* some embodiments showing different positions of the pick-up tubes and the associated construction of the single and dual mu-metal shieldings.

In an embodiment, shown in FIG. 1, of a television camera according to the invention, suitable for colour television, OL denotes an objective lens and a lens system, respectively. In the camera, the lens and the lens system OL, respectively are followed by an optical path OP, the optical axis of lens OL and path OP being indicated by reference OA at the lens OL. An optical colour separating system OS is provided in the optical path OP, which causes the optical path OP to be split into three optical paths OP1, OP2 and OP3. By way of example, let it be assumed that the blue, red and green light components, respectively of the light obtained in the camera through the lens OL and originating from a scene to be televised, are present in the respective optical paths OP1, OP2, and OP3. The colour separating system OS is, for example, formed by of a colour separating prism or by mirrors. In the respective optical paths OP1, OP2 and OP3, pick-up tubes are arranged, denoted by T1, T2 and T3, respectively. The optical axes of the respective pick-up tubes T1, T2 and T3, which axes correspond to the optical axis of the optical path OP1, OP2 and OP3, respectively are designated by OA1, OA2, and OA3, respectively. For the optical axis OA which extends substantially in a horizontal direction, the axes OA2 and OA3 extend substantially in a vertical direction, the axis OA1 having in FIG. 1 the same direction as the axis OA. The pick-up tubes T comprise each a mu-metal shielding against magnetism, referenced mu1. The shielding mu1 is shown by way of example in the form of a cylindrical sleeve in which one of the pick-up tubes T with deflection and focussing means is present. Picture signal generation in the pick-up tubes T is effected in known manner line and field-sequentially. In this situation, the pick-up tubes T comprise an electron gun for generating an electron beam scanning a target plate, whereby a potential image corresponding to a scene to be recorded is converted into a picture signal. For the pick-up tube T1 arranged horizontally in FIG. 1 the line scan is effected in a horizontal direction and the field scan in the vertical direction. For the vertically arranged pick-up tubes T2 and T3 the line and field scan are both effected in two horizontal directions which are arranged crosswise to each other. FIG. 1 shows that the pick-up tube T2 is nearer to the true vertical than the pick-up tube T3.

The pick-up tube T1 has the mu-metal shielding mu1 as a single shielding against the earth magnetic field and/or strong electro-magnetic fields. At the pick-up tubes T2 and T3 of FIG. 1, the mu-metal shielding mu1 forms part, as a first shielding member, of a dual shielding (mu1, mu2, mu2'), which by way of second shielding member comprises two mu-metal plates mu2 and mu2' on the both sides of the tubes T2 and T3. In the drawing, the plates mu2 and mu2' are shown having a solid surface, but in practice the surface may have holes through which the necessary camera adjustment can be effected. FIG. 1 shows that the predominantly solid, flat or not flat plate surface in the region of the pick-up tubes T2 and T3 overlaps both tubes. In practice it has been found that when the plate is formed in such a manner that it overlaps the shielding mu2 and mu2', respectively results in a good shielding against magnetic fields.

From the arrangement of the pick-up tubes T1, T2 and T3 shown in FIG. 1 it can be seen that the tube T1 extends substantially in the horizontal direction and that the tubes T2 and T3 extend substantially in the vertical directions. The earth magnetic field is then present as a radially-directed magnetic field at the pick-up tube T1 and as an axial magnetic field at the pick-up tubes T2 and T3. In this situation the axes OA2 and OA3 are oppositely arranged in the vertical direction. This results in deflection errors at the pick-up tubes T2 and T3 also having opposite directions. In practice it has been found that when only the shieldings mu1 are used, the deflection errors at the pick-up tube T1 caused by the radial field are acceptable, but that the opposite deflection errors at the pick-up tubes T2 and T3 are impermissibly large. The maximum deflection errors occur in the corners of the displayed television picture. To compensate for these errors, it has been found that the shieldings mu2 and mu2' in the form of plates are the solution to obtain acceptable deflection errors.

In practice it has been found that the deflection errors can be further reduced by a factor of 10 to 20%, if the mu-metal shieldings mu2 and mu2' are annealed.

FIG. 2 shows schematically by way of example in the FIGS. *2a*, *2b*, *2c* and *2d* some arrangements of the pick-up tubes T1, T2 and T3. FIG. *2a* corresponds predominantly to the television camera structure described with reference to FIG. 1. Components, optical paths and axes already shown in FIG. 1 are given the same reference numerals in FIG. 2. FIGS. *2a*, *2b*, *2c* and *2d* show systems of coordinates, in which V denotes the vertical axis and H1 and H2 denote two crosswise-arranged horizontal axes. As shown in FIG. *2a*, the axial axis OA1 extends in the horizontal direction H1. FIG. *2b* differs from FIG. *2a* in that the pick-up tube T1 having the axial axis OA1 now extends in the horizontal direction H2. FIG. *2c* shows that there is only one vertically arranged pick-up tube T3 and that the pick-up tubes T1 and T2 extend in the horizontal directions H1 and H2, respectively. FIG. *2d* shows a construction having one vertically-arranged pick-up tube T2 and two, oppositely arranged pick-up tubes T1 and T3 extending in the horizontal direction H2. Instead of oppostely-arranged pick-up tubes a parallel arrangement may alternatively be used.

For all the colour television camera embodiments shown in FIG. 2 it holds that when the optical axis OA of the objective lens OL extends substantially in the horizontal direction, the axial axis of the at least one pick-up tube having the dual mu-metal shielding (mu1, mu2, mu2') extends substantially in a vertical direction and the axial axis of the at least one pick-up tube having the single mu-metal shielding (mu1) extends substantially in a horizontal direction.

The use of the two, overlapping mu-metal plate-shaped shieldings mu2 and mu2', shown in FIGS. *2a* and *2b* were found to result in practice in a maximum deflection error reduced to approximately one third. When a single overlapping plate shielding mu2 or mu2' is used the reduction in the deflection error is approximately 50%. In an example of error values accurring when a camera is moved, unacceptable colour registration errors of approximately 180 ns were reduced to acceptable errors of 50 to 100 ns.

What is claimed is:

1. A television camera comprising at least one pick-up tube, a dual mu-metal shielding against magnetism provided at the pick-up tube and having first and second shielding members, and an objective lens, the pick-up tube being arranged in the camera in an optical path subsequent to the lens, characterized in that the camera which is in the form of a colour television camera comprising a plurality of pick-up tubes, comprises at least one pick-up tube having a single mu-metal shielding in addition to the at least one pick-up tube having the dual mu-metal shielding, the axial axis of the at least one pick-up tube with the dual mu-metal shielding extending, when the optical axis of the objective lens extends substantially horizontally, substantially in a vertical direction and the axial axis of the at least one pick-up tube with the single mu-metal shielding extending substantially in a horizontal direction.

2. A television camera as claimed in claim 1, characterized in that the second shielding member of the dual mu-metal shielding is in the form of a plate arranged near the pick-up tube, the plate having a predominantly solid plate surface covering the pick-up tube with an overlap at one side.

3. A television camera as claimed in claim 2, characterized in that the second shielding member of the dual mu-metal shielding comprises two plates, arranged on both sides of the pick-up tube.

4. A television camera as claimed in claim 2, characterized in that when the camera comprises two pick-up tubes with the dual mu-metal shielding, and wherein the second shielding member is constituted by one plate overlapping both pick-up tubes.

5. A television camera as claimed in claim 2, characterized in that the second shielding member in the form of a plate is constituted by an annealed plate.

6. A television camera as claimed in claim 3, characterized in that the second shielding member in the form of a plate is constituted by an annealed plate.

7. A television camera as claimed in claim 4, characterized in that the second shielding member in the form of a plate is constituted by an annealed plate.

8. A television camera as claimed in claim 3, characterized in that the camera comprises two pick-up tubes with the dual mu-metal shielding, and wherein the second shielding member is constituted by one plate overlapping both pick-up tubes.

* * * * *